March 14 1944.   J. ATTIAS   2,344,196
GAS HEATED SOLDERING IRON
Filed Jan. 16, 1942
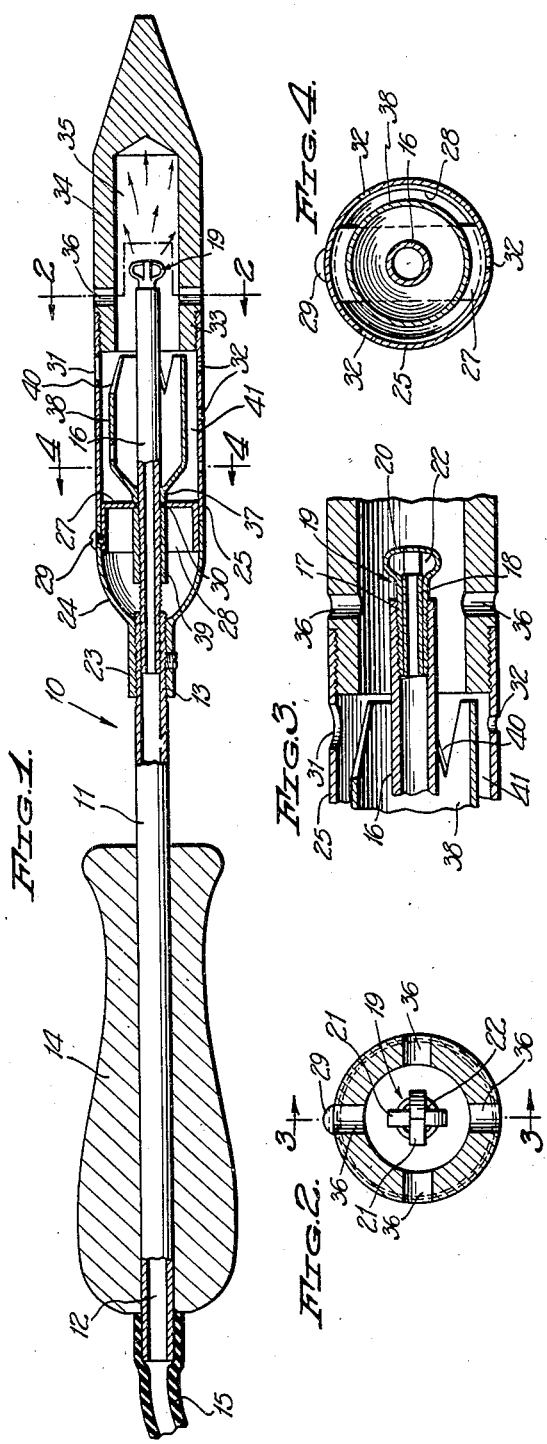
INVENTOR.
JOSHUA ATTIAS.
BY
ATTORNEYS.

Patented Mar. 14, 1944

2,344,196

UNITED STATES PATENT OFFICE 2,344,196

GAS-HEATED SOLDERING IRON

Joshua Attias, New York, N. Y.

Application January 16, 1942, Serial No. 426,999

2 Claims. (Cl. 158—26)

This invention relates to improvements in soldering irons and more specifically to a soldering iron having self contained gas heating means.

One of the important features of the invention resides in a soldering iron in which the soldering bit is heated from within the same by the flame of an enclosed gas burner, thereby reducing the danger of fire damage during use of the soldering iron.

Another feature of the invention is to provide a gas heated soldering iron in which the flame from the gas burner is concentrated upon the soldering bit to effect rapid heating thereof, there being suitable means for heat insulating the soldering iron between the bit and the handle to prevent excessive heating of the parts other than the bit.

Other novel features of the invention are to provide a gas heated soldering iron which is light in weight to facilitate easy manipulation of the same when in use and to prevent over-tiring of the hand of an operator during lengthy continuous use; to provide a gas heated soldering iron which is simple and inexpensive of construction, easy to assemble and take apart for cleaning and repair, and which embodies a crown shaped burner tip for producing radially extending streams of flame in the direction of the walls of the combustion chamber of the soldering bit to expedite the heating thereof.

Other features of the invention will become apparent as the following specification is read in conjunction with the accompanying drawing, in which:

Figure 1 is a vertical longitudinal sectional view of a gas heated soldering iron constructed in accordance with the invention.

Figure 2 is an enlarged vertical transverse sectional view on the line 2—2 of Figure 1.

Figure 3 is a detail vertical longitudinal sectional view on the line 3—3 of Figure 2.

Figure 4 is an enlarged vertical transverse sectional view on the line 4—4 of Figure 1.

Referring to the drawing by reference characters, 10 designates a gas heated soldering iron constructed in accordance with the invention, and which includes a straight length tube or pipe 11 having a gas inlet end 12 and an externally screw threaded gas outlet end 13. Fixedly secured to and surrounding the tube 11 and terminating short of the inlet end 12 is a handle 14 by which the soldering iron 10 may be gripped and held when in use. The inlet end 12 of the tube 11 is adapted to receive one end of a rubber tube 15 through which a mixture of gas and air is forced.

Tightly fitting into the outlet end 13 of the tube 11 is a burner tube 16 the outer end of which is internally screw threaded as at 17 to threadedly receive the tubular stem 18 of a burner tip 19. The burner tip 19 is provided with a crown shaped burner head 20 formed by a pair of integral crossed looped or arch elements 21, the space between the crossed elements constituting radially disposed gas outlets or openings 22.

Threadedly connected to the threaded outlet end 13 of the tube 11 is the internally screw threaded nipple 23 provided on the inner end of a shell-like casing section 24. Connected to the casing section 24 is a cylindrical casing section 25 the inner end of which is provided with a transverse partition wall 27 having a continuous flange 28 which extends beyond the inner end of the casing section 25 in telescoping relation with respect to the outer end of the casing section 24. The partition 27 may be fixedly secured to the casing section 25 in any suitable manner such as by welding. The section 25 is connected to the section 24 by screws 29 which thread through registering openings in the section 24 and in the telescoping flange 28. The partition wall 27 is provided with a central opening 30 through which the burner tube 16 freely extends. The casing section 25 is provided with one or more lighting openings 31 and with a series of radially disposed air and ventilating openings 32.

The outer free end of the casing section 25 is internally screw threaded for threading engagement with inner threaded end 33 of a copper solder bit 34. Opening through the inner end of the solder bit 34 is a combustion and heating chamber 35 which is round in cross section as best illustrated in Figure 2. The burner tip 19 is disposed on a plane outwardly beyond the threaded end of the casing section 25 and extends well within the combustion and heating chamber 35 in spaced relation to the walls thereof. The solder bit 34 is provided with a series of radially extending exhaust gas openings 36 which are disposed adjacent to the burner tip 19 and which openings may also act as peep holes to determine when the burner tip is lighted.

Threaded to the burner tube 16 is the reduced end 37 of a heat insulating shell member 38, the same being constructed of metal and disposed in spaced concentric relation with respect to the cylindrical casing section 25. The inner end of the member 38 bears against the outer side of the partition wall 27 and coacts with a nut 39 also threaded to the burner tube 16 and which abuts the other side of the partition wall 27. The outer open end of the member 38 terminates short of the inner end of the solder bit 34, and said end is provided with notches 40 which aline with the lighting openings 31 to provide unobstructed passage to the heating and combustion chamber 35. In use, a mixture of gas and air under pressure is supplied to the tube 11 by means of a gas supply hose 15, the combustible gas and air flowing to the burner tube 16 and thence into the combustion and heating chamber 35 through the radial passages 22 in the crown shaped burner tip 19. The operator inserts a match or other form of flame through one of the lighting openings 31, thus igniting the escaping mixture of gas and air within the heating chamber 35. Due to the pressure of the combustible gas and air mixture escaping through the passages 22, sharp radially extending streams of blue flame will lick the side walls of the chamber 35, the said streams of flame also being projected in a forwardly direction against the closed end wall of the chamber 35. By this projection of the flame, the copper soldering bit 34 will be rapidly heated, the waste gases escaping to the atmosphere through the exhaust gas openings 36. The intense heat within the chamber 35 will of course tend to heat the metal casing 25, but such casing is insulated against overheating by the air space 41 provided between the casing section 25 and the insulating shell member 38. Any heat which accumulates in the air space escapes in the atmosphere through the openings 32.

From the foregoing description it will be seen that the flame from the burner is confined within the chamber 35, thus preventing danger of fire during use of the soldering iron. Also, by reason of the novel construction the bit 34 may be unscrewed from the casing section 25 to obtain access to the combustion chamber 35 for cleaning and to facilitate cleaning and replacement of burner tip 19 and burner tube 16 should repair be necessary.

While I have shown and described what I consider to be the most practical embodiment of my invention, I wish it to be understood that such changes in construction and design as come within the scope of the appended claims may be resorted to if desired.

Having thus described the invention, what I claim as new and desire to secure by Letters Patent of the United States, is:

1. A gas heated soldering iron comprising a gas tube composed of an inlet tube section and a burner tube section of a smaller diameter than the inlet tube section having their inner ends connected together and being disposed in axial alinement, a handle surrounding and secured to the inlet tube section and disposed inwardly of the ends thereof, a cylindrical casing having a co-axial nipple portion at one end threaded to said inlet tube, said casing being spaced from the burner tube section and having its other end open and terminating in a plane short of the outer end of the burner tube section, air inlet openings provided in said casing, a soldering bit having a combustion chamber opening through the inner end thereof, the inner end of said soldering bit telescoping the outer open end of said casing and being fixedly secured thereto, the outer free end of the burner tube section extending into said combustion chamber, said soldering bit having combined peep and exhaust openings provided therein establishing communication between said combustion chamber and the atmosphere.

2. A gas heated soldering iron as set forth in claim 1, including a cylindrical shield member fixedly carried by the inlet tube section and arranged in spaced concentric relation to the casing and burner tube section to provide a heat insulating space between the casing and the shield member to prevent excessive heating of said casing.

JOSHUA ATTIAS.